United States Patent [19]

Kato et al.

[11] Patent Number: 5,371,611
[45] Date of Patent: Dec. 6, 1994

[54] METHOD FOR AND SYSTEM OF DECODING COMPRESSED CONTINUOUS-TONE DIGITAL IMAGE DATA

[75] Inventors: Hisaharu Kato; Toshiaki Endo, both of Tokyo, Japan

[73] Assignee: Kokusai Denshin Denwa Kabushiki Kaisha, Tokyo, Japan

[21] Appl. No.: 107,016

[22] Filed: Aug. 17, 1993

[30] Foreign Application Priority Data

Aug. 26, 1992 [JP] Japan .................. 4-250571

[51] Int. Cl.$^5$ .............................. H04N 1/40
[52] U.S. Cl. .................. 358/456; 358/433; 348/568
[58] Field of Search ............. 358/456, 426, 261.1, 358/261.3, 433

[56] References Cited

U.S. PATENT DOCUMENTS 4,985,766 1/1991 Morrison et al. ............. 358/133

OTHER PUBLICATIONS

Ohta & Koga–Adaptive VWL Coding of Transform Coefficients for Sub–Primary Rate Video Transmission–pp. 8.5.1–8.5.5.

Kim Ngan–Image Display Techniques Using the Cosine Transform–pp. 173–177–IEEE, vol. Assp 32, Feb. 84.

*Primary Examiner*—Edward L. Coles, Sr.
*Assistant Examiner*—Madeleine Anh-Vinh Nguyen
*Attorney, Agent, or Firm*—Pollock, VandeSande & Priddy

[57] ABSTRACT

For decoding compressed digital image data of source image, end-of-block (EOB) codes appearing in entropy coded data are utilized to detect a portion of "0" elements in a frequency range coefficient matrix. An inverse orthogonal transform process is fully or partly omitted according to the "0" coefficient distribution.

5 Claims, 11 Drawing Sheets

FIG. 2

| 16 | 11 | 10 | 16 | 24 | 40 | 51 | 61 |
|----|----|----|----|----|-----|-----|-----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 3

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 5

51 (COEFFICIENT MATRIX)

| 300 | 200 | 100 | 50 |
|---|---|---|---|
| 250 | 280 | 120 | 40 |
| 160 | 140 | 130 | 30 |
| 80 | 60 | 50 | 20 |

÷

52 (QUANTIZATION MATRIX)

| 16 | 32 | 64 | 128 |
|---|---|---|---|
| 32 | 64 | 128 | 256 |
| 64 | 128 | 256 | 512 |
| 128 | 256 | 512 | 512 |

53

| 300/16 | 200/32 | 100/64 | 50/128 |
|---|---|---|---|
| 250/32 | 280/64 | 120/128 | 40/256 |
| 160/64 | 140/128 | 130/256 | 30/512 |
| 80/128 | 60/256 | 50/512 | 20/512 |

=

54 (QUANTIZED COEFFICIENT MATRIX)

| 18 | 6 | 1 | 0 |
|---|---|---|---|
| 7 | 4 | 0 | 0 |
| 2 | 1 | 0 | 0 |
| 0 | 0 | 0 | 0 |

55 (ZIG-ZAG SCAN MATRIX)

| 0 | 1 | 5 | 6 |
|---|---|---|---|
| 2 | 4 | 7 | 12 |
| 3 | 8 | 11 | 13 |
| 9 | 10 | 14 | 15 |

56

| 18 | 6 | 7 | 2 | 4 | 1 | 0 | 0 | 1 | EOB |

TO ENTROPY CODER

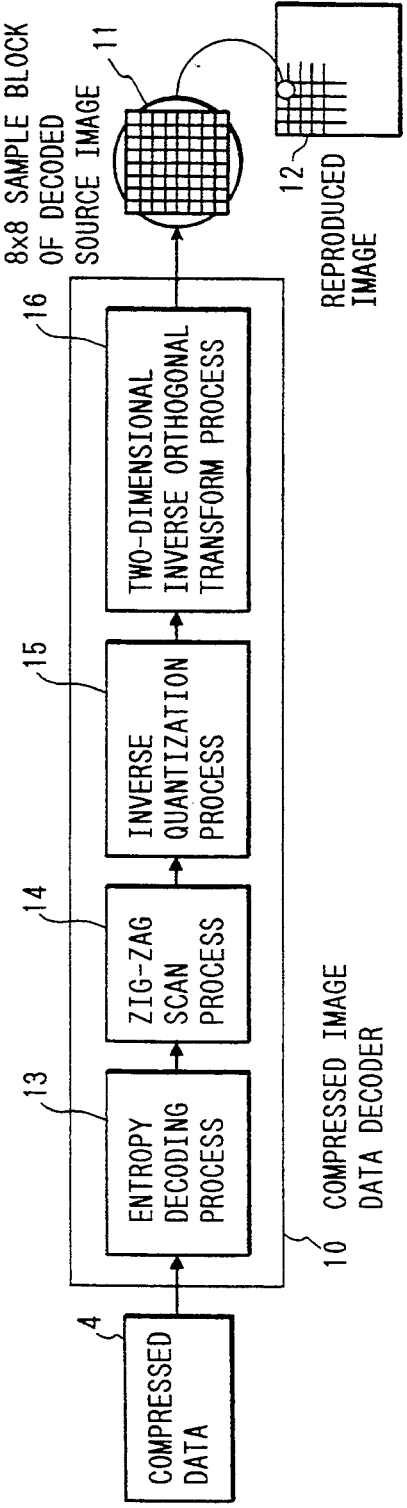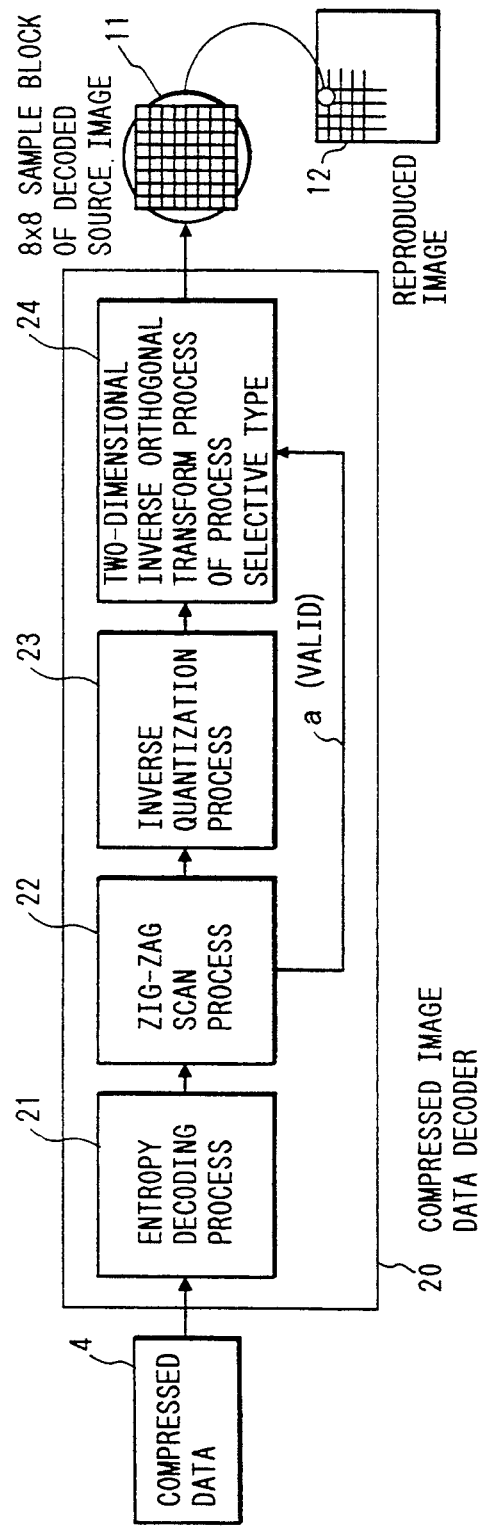

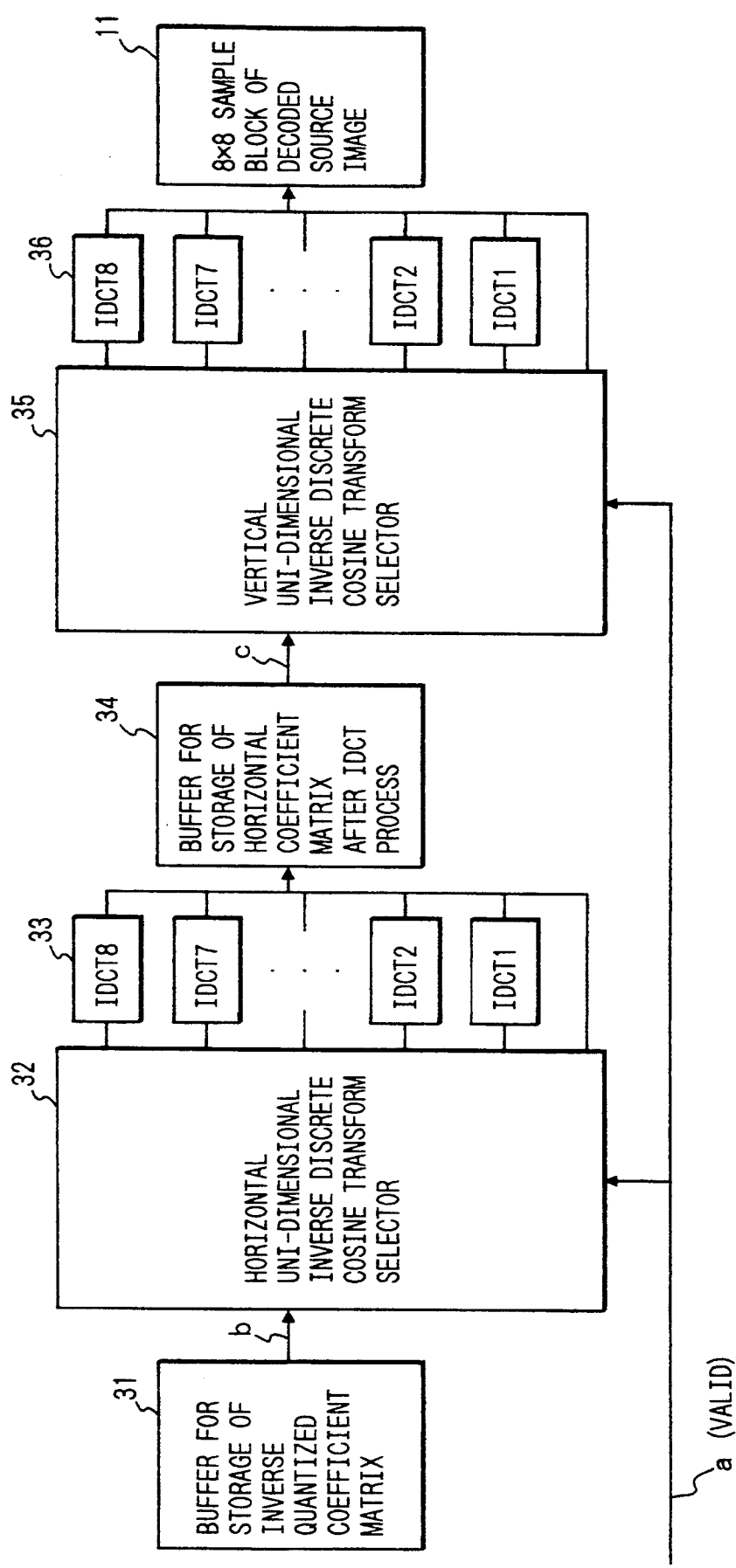

FIG. 9

| | | | | | | | |
|---|---|---|---|---|---|---|---|
| 0 | 1 | 5 | 6 | 14 | 15 | | |
| 2 | 4 | 7 | 13 | 16 | | | |
| 3 | 8 | 12 | 17 | | | | |
| 9 | 11 | 18 | | | | | |
| 10 | 19 | | | | | | |
| 20 | | | | | | | |
| 21 | | | | | | | |
| | | | | | | | |

← ROW USING IDCT6
← ROW USING IDCT5
← ROW USING IDCT4
← ROW USING IDCT3
← ROW USING IDCT2
← ROW USING IDCT1
← ROW NOT USING IDCT
← ROW NOT USING IDCT

FIG. 10

| | | | | | | | |
|---|---|---|---|---|---|---|---|
| 0 | 1 | 5 | 6 | 14 | 15 | | |
| 2 | 4 | 7 | 13 | 16 | | | |
| 3 | 8 | 12 | 17 | | | | |
| 9 | 11 | 18 | | | | | |
| 10 | 19 | | | | | | |
| 20 | | | | | | | |
| 21 | | | | | | | |
| | | | | | | | |

↑ ↑ ↑ ↑ ↑ ↑ ↑ ↑ — COLUMNS USING IDCT6

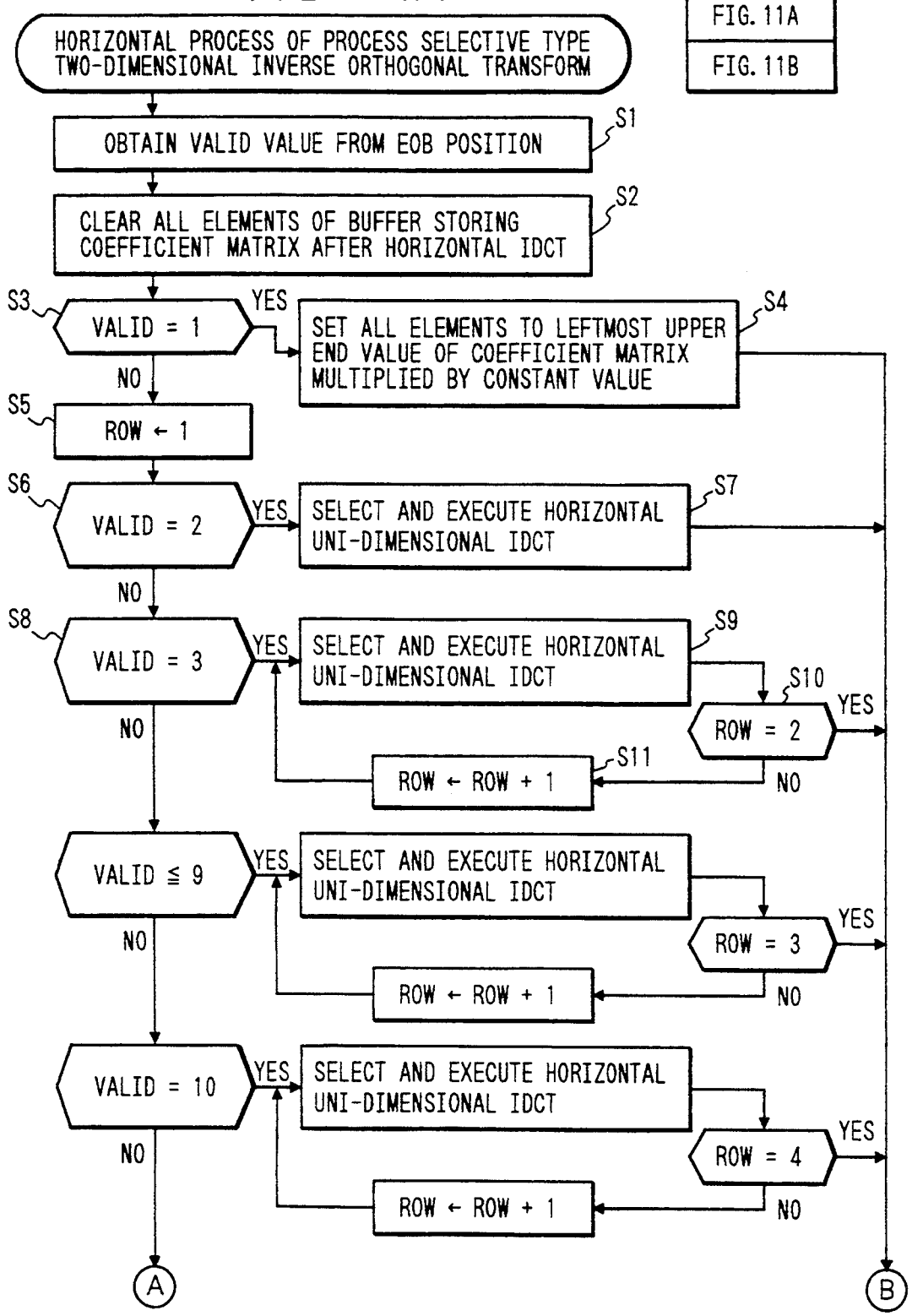

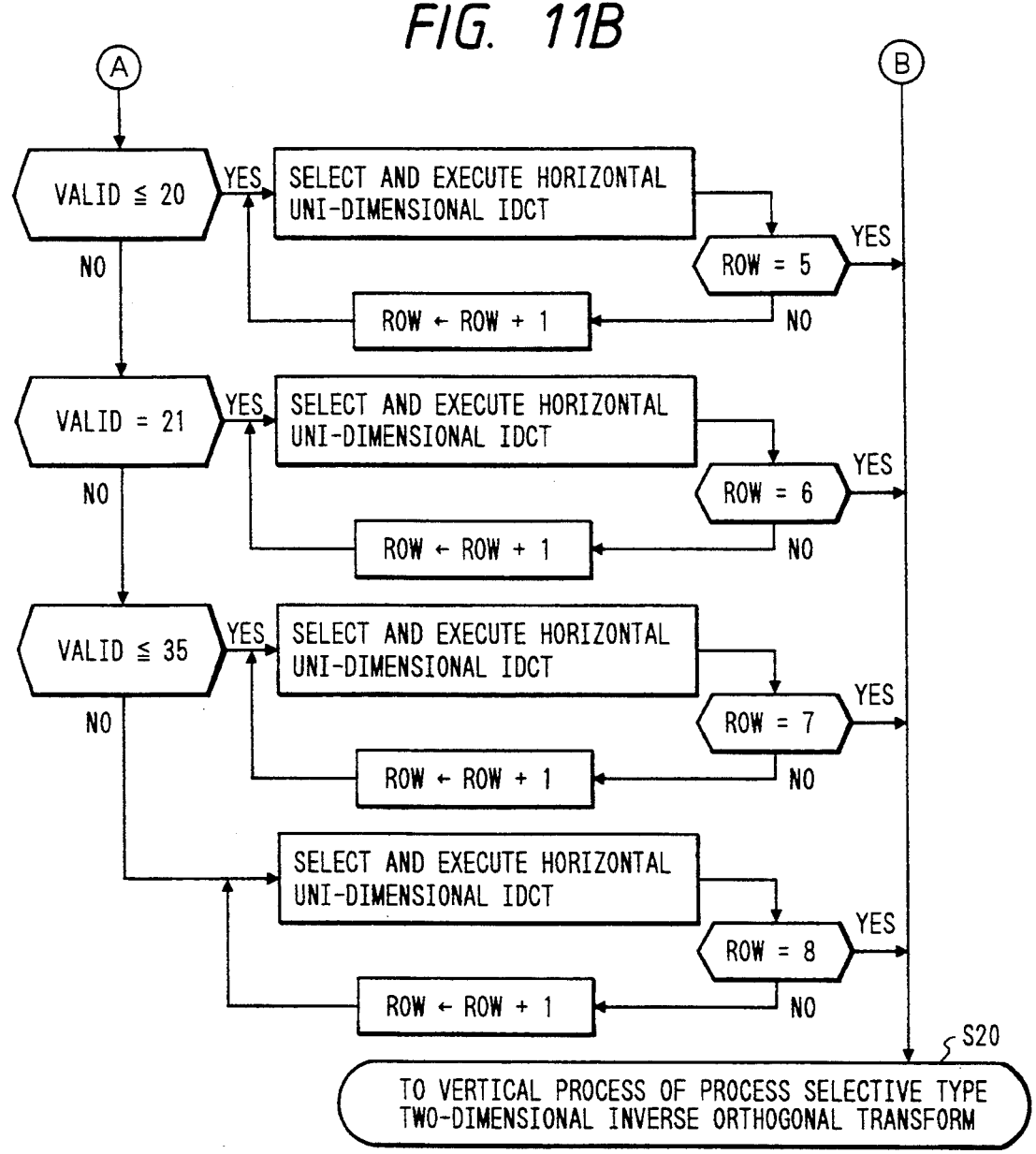

FIG. 12

|  | IDCT1 | IDCT2 | IDCT3 | IDCT4 | IDCT5 | IDCT6 | IDCT7 | IDCT8 |
|---|---|---|---|---|---|---|---|---|
| ROW=1 | —— | VALID=<br>2~5 | VALID=<br>6 | VALID=<br>7~14 | VALID=<br>15 | VALID=<br>16~27 | VALID=<br>28 | VALID=<br>29~63 |
| ROW=2 | VALID=<br>3~4 | VALID=<br>5~7 | VALID=<br>8~13 | VALID=<br>14~16 | VALID=<br>17~26 | VALID=<br>27~29 | VALID=<br>30~42 | VALID=<br>43~63 |
| ROW=3 | VALID=<br>4~8 | VALID=<br>9~12 | VALID=<br>13~17 | VALID=<br>18~25 | VALID=<br>26~30 | VALID=<br>31~41 | VALID=<br>42~43 | VALID=<br>44~63 |
| ROW=4 | VALID=<br>10~11 | VALID=<br>12~18 | VALID=<br>19~24 | VALID=<br>25~31 | VALID=<br>32~40 | VALID=<br>41~44 | VALID=<br>45~53 | VALID=<br>54~63 |
| ROW=5 | VALID=<br>11~19 | VALID=<br>20~23 | VALID=<br>24~32 | VALID=<br>33~39 | VALID=<br>40~45 | VALID=<br>46~52 | VALID=<br>53~54 | VALID=<br>55~63 |
| ROW=6 | VALID=<br>21~22 | VALID=<br>23~33 | VALID=<br>34~38 | VALID=<br>39~46 | VALID=<br>47~51 | VALID=<br>52~55 | VALID=<br>56~60 | VALID=<br>61~63 |
| ROW=7 | VALID=<br>22~34 | VALID=<br>35~37 | VALID=<br>38~47 | VALID=<br>48~50 | VALID=<br>51~56 | VALID=<br>57~59 | VALID=<br>60~61 | VALID=<br>62~63 |
| ROW=8 | VALID=<br>36 | VALID=<br>37~48 | VALID=<br>49 | VALID=<br>50~57 | VALID=<br>58 | VALID=<br>59~62 | VALID=<br>63 | VALID=<br>64 |

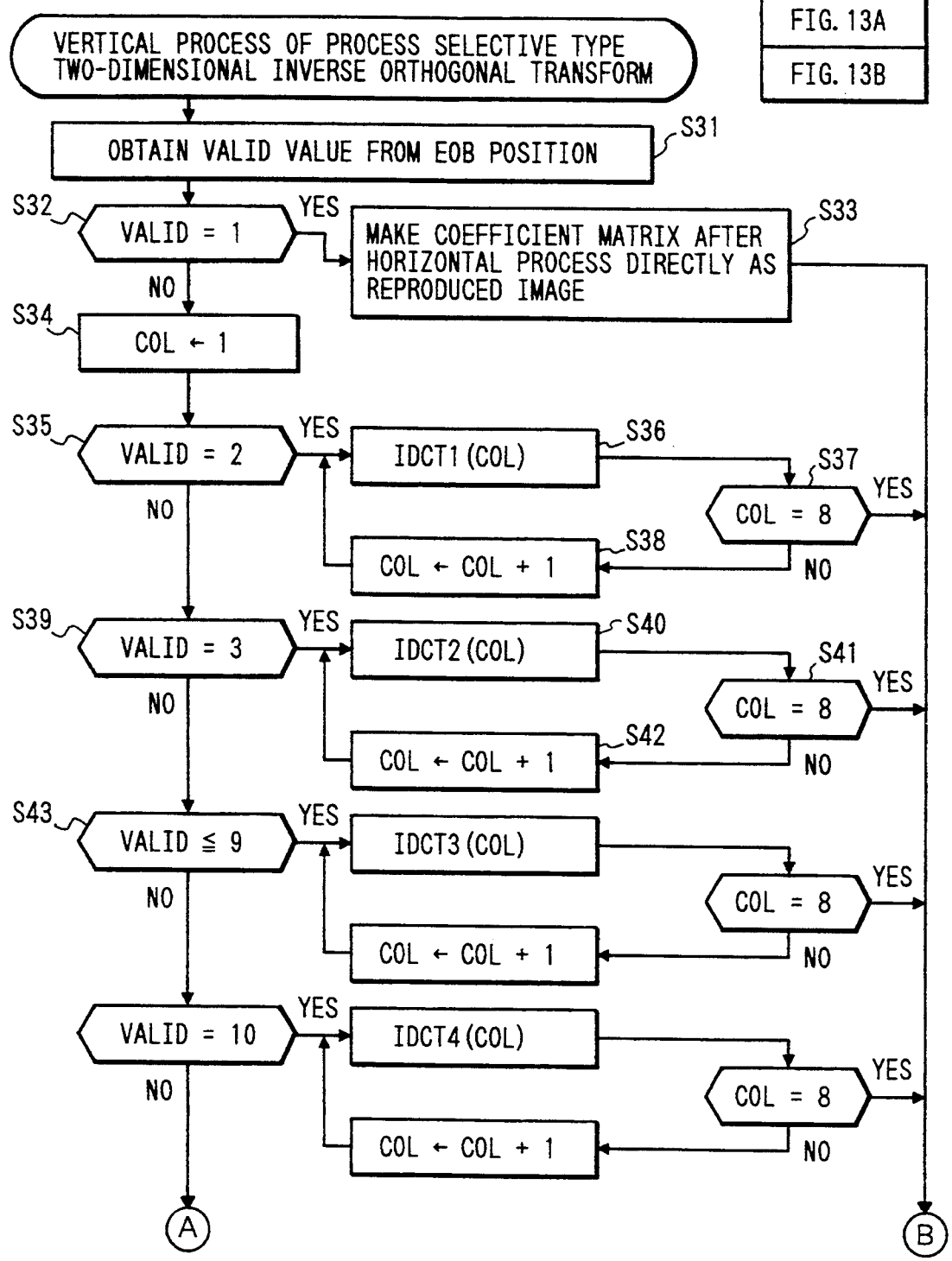

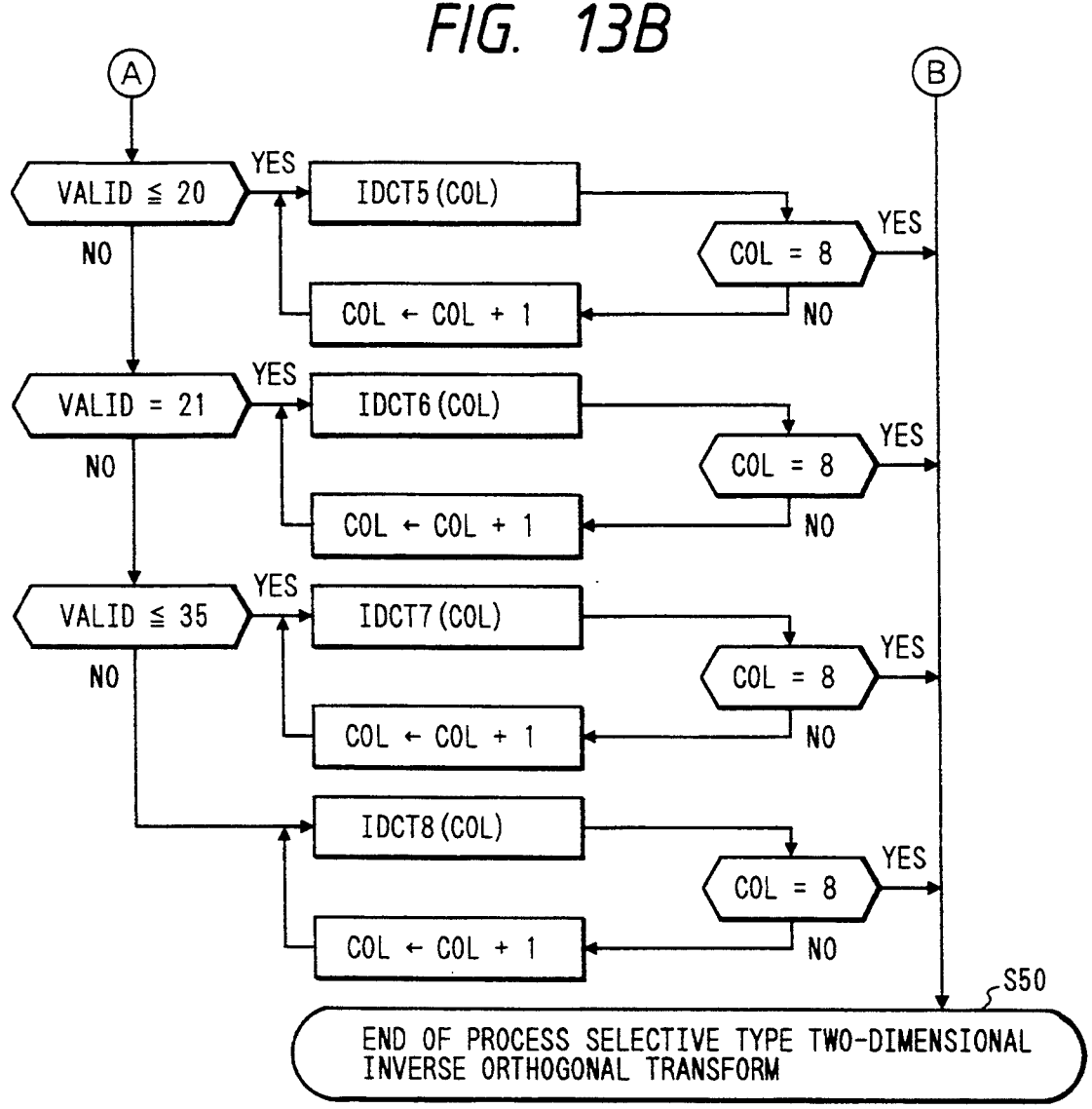

METHOD FOR AND SYSTEM OF DECODING COMPRESSED CONTINUOUS-TONE DIGITAL IMAGE DATA

BACKGROUND OF THE INVENTION

1. Field of the Invention

This invention relates to a method for and a system of decoding compressed digital image data of source image, such as still or motion images, or multiple-valued images of computer graphics or the like.

2. Description of the Prior Art

Heretofore, coding and decoding of a source image to and from compressed digital image data are usually done with a system, in which orthogonal transformation, quantization and entropy coding are combined. A prior art example of still picture coding and decoding to and from compressed digital image data, will now be described with reference to FIGS. 1 to 6.

FIG. 1 shows the structure of a prior art system for compression coding a source image. Referring to the Figure, designated at 1 is an input source image, at 2 is an 8×8 sample block of the source image, at 3 a compressor for compressing the 8×8 sample block, and at 4 compressed image data obtained from the compressor 3. The compressor 3 comprises units 5 to 8.

The unit 5 performs a two-dimensional orthogonal transform process, that is, it does two-dimensional orthogonal transform of the 8×8 sample block. The unit 6 performs a quantization process, that is, it quantizes individual elements of a coefficient matrix obtained in the two-dimensional orthogonal transform process unit 5. The unit 7 performs a zig-zag scan process, that is, it produces a coefficient row of quantized coefficient matrix elements arranged from the lower order. The unit 8 performs an entropy coding process, that is, it codes the coefficient row with Huffman codes, for instance.

Now, the prior art procedure of a compression of source image will be described.

First, a source image 1 on a frame memory is divided into 8×8 pel blocks, and a sample block is extracted. Then, the two-dimensional orthogonal transform process unit 5 effects transform of the aggregate of pels in the block into a two-dimensional frequency space coefficient matrix (of 8×8 elements) using the discrete cosine transform (DCT) which is one type of orthogonal transform. The transform is done with a formula (1):

$$Z(v,u) = \frac{1}{4} C(u)C(v) \sum_{x=0}^{7} \sum_{y=0}^{7} P(x,y) \cos\frac{(2x+1)u}{16}\pi \cdot \cos\frac{(2y+1)v}{16}\pi \quad (1)$$

where $C(0)=0.707$ and $C(n)=1.0$ ($n=1$ to 7). Further, $P(x, y)$ represents the pel values of the 8×8 sample block, and $Z(u, v)$ represents the coefficient values of the 8×8 pel DCT coefficient matrix.

In the coefficient matrix $Z(u, v)$ obtained with the above transform formula, $Z(0, 0)$ represents a DC component, and other $Z(u, v)$ represents AC components.

The quantization process unit 6 quantizes the individual elements in the obtained coefficient matrix $Z(u, v)$ by dividing these elements by elements in the quantization matrix (of 8×8 elements) of the same size as shown in FIG. 2. Of the result of the division, the integral number part is retained, and the remainder is omitted.

In the quantization matrix, as shown in FIG. 2, the higher the frequency of a portion in the coefficient matrix $Z(u, v)$, the numerical value, i.e., the quantization step span, is the greater, and the quantization matrix serves the role of a filter for reducing the high frequency components of the image. More specifically, the left upper part of the quantization matrix shown in FIG. 2 corresponds to low frequency range, while the right lower part corresponds to high frequency range. Thus, it will be seen that the numerical values are greater as one goes from the left top to the right bottom of the quantization matrix.

The individual elements in the quantized coefficient matrix $Z(u, v)$ are rearranged in the order of serial numbers shown in a zig-zag scan matrix in FIG. 3. FIG. 4 shows the manner, in which individual elements S0, S1, ... of the quantized coefficient matrix $Z(u, v)$ are rearranged, and the manner in which the rearranged elements are coded using Huffman codes which are one type of entropy coding. Si ($i=0, 1, \ldots$) represents compressed data obtained as a result of coding using Huffman codes. [EOB] is a Huffman code indicating that the remaining coefficients are all "0", that is, it indicates the end of block.

The coding of the DC component S0 in the coefficient matrix $Z(u, v)$ shown in FIG. 4, is done by classifying inter-block differences in occurrence frequency groups and adding a Huffman code corresponding to a group and a bit row necessary for expressing the pertaining difference. On the other hand, the coding of the AC components S1 is done by classifying sets each of a non-"0" coefficient value in the rearranged coefficient matrix and the number of preceding "0" coefficients in occurrence frequency groups and adding a Huffman code corresponding to a group and a bit row necessary for expressing the pertaining non-"0" coefficient value.

Since the high frequency reduction filter is provided for each element in the coefficient matrix $Z(u, v)$ as noted above, the elements in the rearranged coefficient matrix are often "0" from a certain position to the end of block. In such a case, the Huffman code [EOB] representing the end of block is added after the last non-"0" coefficient, and the Huffman coding of the subsequent coefficients is omitted.

A specific example of coding will now be described with reference to FIG. 5. In FIG. 5, 4×4 pel block is taken as an example instead of 8×8 pel block for easier understanding of the description. A coefficient matrix $Z(u, v)$, shown at 51, obtained by applying the formula (1) noted above to 4×4 pel block $P(x, y)$ not shown, is divided by corresponding elements in the quantization matrix 52, as shown at 53. The remainder of the quotient of each division is omitted, thus forming a quantized coefficient matrix 54 consisting of integral elements. The elements of the quantized coefficient matrix 54 are rearranged in the order of the elements in the zig-zag scan matrix 55 to obtain a quantized coefficient matrix 56. This quantized coefficient matrix 56 is then entropy coded. Thus, an entropy coded row as shown in FIG. 4 is obtained.

Now, the structure of the prior art system of decoding compressed digital image data of a source image will be described with reference to FIG. 6. Referring to FIG. 6, designated at 10 is a compressed image data decoder, at 11 an 8×8 sample block of decoded image, and at 12 a reproduced image. The decoder 10 comprises units 13 to 16.

The unit 13 performs an entropy decoding process, that is, it decodes compressed image data coded with Huffman codes or the like. The unit 14 performs a zig-zag scan process, that is, it produces an 8×8 element coefficient matrix from quantized coefficient row of elements arranged from lower orders. The unit 15 performs an inverse quantization process, that is, it inversely quantizes the quantized coefficient matrix. The unit 16 performs a two-dimensional inverse orthogonal transform process, that is, it effects two-dimensional inverse orthogonal transform of the reproduced coefficient matrix to reproduce the 8×8 pel block of the source image.

Now, the prior art procedure of decoding compressed image data of source image will be shown. The decoding procedure is inverse to the coding procedure.

The entropy decoding process unit 13 decodes Huffman codes. The zig-zag scan process unit 14 rearranges the coefficient row obtained by the decoding in the order of smaller serial numbers shown in the zig-zag scan matrix of FIG. 3. When a Huffman code [EOB] indicative of the end of block appears, the subsequent coefficients are made "0", thus reproducing the quantized coefficient matrix (of 8×8 elements).

Then, the inverse quantization process unit 15 effects inverse quantizing by multiplying the individual elements in the quantized coefficient matrix by the elements in the same quantization matrix as that used in encoding (see FIG. 2). As a result of tills inverse quantizing, the two-dimensional frequency space coefficient matrix is reproduced.

Then, the two-dimensional inverse orthogonal transform process unit 16 effects inverse discrete cosine transform (IDCT) of the two-dimensional frequency space coefficient matrix to reproduce the 8×8 sample block 11 of source image. The entire source image is reproduced by iteration of the reproduction of the above 8×8 sample block.

The inverse orthogonal transform in the two-dimensional inverse orthogonal transform process unit 16 involves an enormous quantity of operations if it is executed as specified by the definition formula. To obtain fast operation, FFT (fast Fourier transform) or like fast operation processes have heretofore been proposed. However, even such methods may not permit sufficiently fast processing to be obtained when the two-dimensional orthogonal transform is done on a large number of blocks as in image compression.

SUMMARY OF THE INVENTION

An object of the invention is to provide a method for and a system of decoding compressed digital image data of a source image, which can solve the above problem in the prior art and can realize fast image reproduction by omitting wasteful inverse orthogonal transform process operations from the inverse orthogonal transform process involving enormous operation quantity.

A feature of the invention resides in that in the decoding of compressed digital image data of source image the code of the end of block [EOB] appearing in entropy coded data is utilized to detect "0" element portions in the frequency range coefficient matrix and partly or fully omit the inverse orthogonal transform process according to the distribution of "0" coefficients.

BRIEF DESCRIPTION OF THE DRAWINGS

FIG. 2 is a view showing an example of a quantization matrix used in quantization and inverse quantization process units;

FIG. 3 is a view showing an example of a zig-zag scan matrix for rearranging coefficients used in a zig-zag scan process unit;

FIG. 5 is a view showing a specific example of the flow of a prior art coding process;

FIG. 6 is a block diagram outlining a prior art system of decoding compressed digital image data of a source image;

FIG. 7 is a block diagram outlining a decoding system according to the invention;

FIG. 8 is a block diagram showing a specific example of a two-dimensional inverse orthogonal transform process unit of process selective type shown in FIG. 7;

FIG. 9 is a view showing a specific example of a horizontal inverse orthogonal transform process according to the invention;

FIG. 10 is a view showing a specific example of a vertical inverse orthogonal transform process according to the invention;

FIG. 11 is a schematic representation showing the organization of FIGS. 11A and 11B which comprise a flow chart for explaining the operation of horizontal process of two-dimensional inverse orthogonal transform of process selective type;

FIG. 12 is a view showing rules of horizontal uni-dimensional IDCT selection; and FIG. 13 is a schematic representation showing the organization of FIGS. 13A and 13B which comprise a flow chart for explaining the operation of vertical process of two-dimensional inverse orthogonal transform of process selective type.

DETAILED DESCRIPTION OF THE PREFERRED EMBODIMENT

Figure 1:
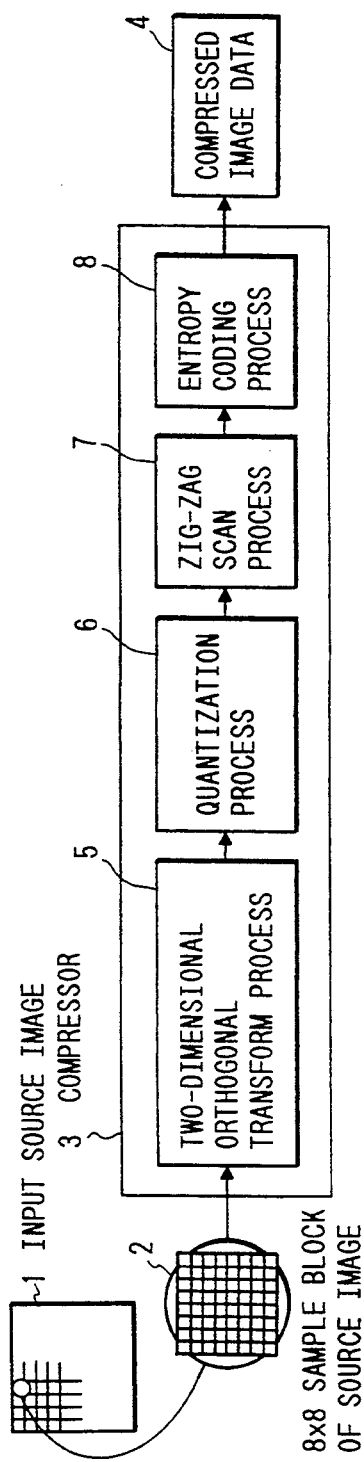
FIG. 1 is a block diagram outlining a prior art system for compression coding a source Image.
Figure 4:
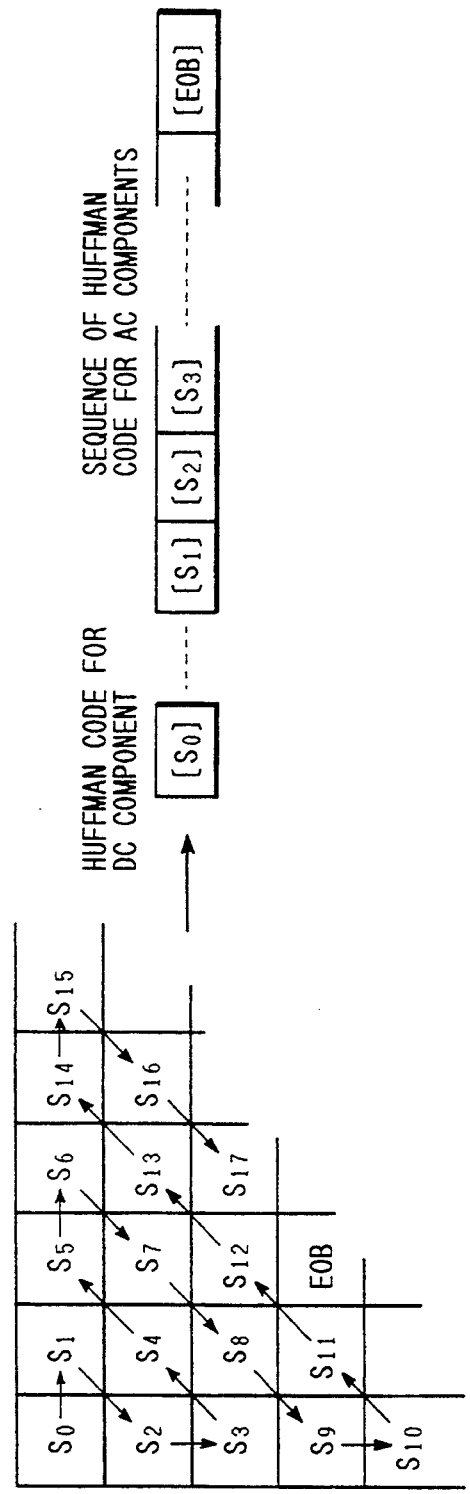
FIG. 4 is a view showing rearranging of elements by zig-zag scan and a code row obtained by Huffman coding.

FIG. 7 outlines the structure of the system of decoding compressed digital image data of source image according to the present invention. Referring to FIG. 7, designated at 20 is a compressed image data decoder comprising units 21 to 24. The unit 21 performs an entropy decoding process to decode compressed digital image data coded by Huffman coding or the like. The unit 22 performs a zigzag scan process. That is, it produces an 8×8 element coefficient matrix from a quantized coefficient row of elements arranged from lower orders, and also detects a position of generation of a code of the end of block [EOB] to output a position signal a. The unit 23 performs an inverse quantization process or dequantize process, that is, inversely quantizes the quantized coefficient matrix. The unit 24 performs a two-dimensional inverse orthogonal transform process of process selective type. That is, it performs a simplified two-dimensional inverse orthogonal transform process on the basis of the position signal a detected as end-of-block code in the zig-zag scan process unit 22. According to the invention, the 8×8 sample block 11 of source image is reproduced through the simplified two-dimensional inverse orthogonal transform process.

Now, a specific example the two-dimensional inverse orthogonal transform process unit 24 of process selective type will be described with reference to FIG. 8.

Referring to FIG. 8, designated at 31 is a buffer for storage of inverse quantized coefficient matrix, at 32 is a horizontal uni-dimensional inverse discrete cosine transform selector, and at 33 is a simplified uni-dimensional discrete cosine transform group. Designated at 34 is a buffer for storage of horizontal coefficient matrix after IDCT process, at 35 is a vertical uni-dimensional inverse discrete cosine transform selector, and at 36 is a simplified uni-dimensional inverse discrete cosine transform group. The buffer 31 supplies a row vector b of the coefficient matrix to the horizontal uni-dimensional inverse discrete cosine transform selector 32. The buffer 34 supplies a column vector c of the coefficient matrix to the vertical uni-dimensional inverse discrete cosine transform selector 35.

The simplified uni-dimensional inverse discrete cosine transform groups 33 and 36 concern process with the operation quantity thereof reduced under assumption of "0" higher order coefficients. The 8-point uni-dimensional inverse discrete cosine transform (IDCT) 8 is expressed by matrix operation as expressed by the following formula (2).

$$\begin{vmatrix} p0 \\ p7 \\ p1 \end{vmatrix} = \begin{vmatrix} c4 & c1 & c2 & c3 & c4 & s3 & s2 & s1 \\ c4 & -c1 & c2 & -c3 & c4 & -s3 & s2 & -s1 \\ c4 & c3 & s2 & -s1 & -c4 & -c1 & -c2 & -s3 \end{vmatrix} \begin{vmatrix} z0 \\ z1 \\ z2 \end{vmatrix} \quad (2)$$

$$\begin{vmatrix} p6 \\ p2 \end{vmatrix} = \begin{vmatrix} c4 & -c3 & s2 & s1 & -c4 & c1 & -c2 & s3 \\ c4 & s3 & -s2 & c1 & -c4 & s1 & c2 & c3 \end{vmatrix} \begin{vmatrix} z3 \\ z4 \end{vmatrix}$$

$$\begin{vmatrix} p5 \\ p3 \\ p4 \end{vmatrix} = \begin{vmatrix} c4 & -s3 & -s2 & -c1 & -c4 & -s1 & c2 & -c3 \\ c4 & s1 & -c2 & s3 & c4 & c3 & -s2 & -c1 \\ c4 & -s1 & -c2 & -s3 & c4 & -c3 & -s2 & c1 \end{vmatrix} \begin{vmatrix} z5 \\ z6 \\ z7 \end{vmatrix}$$

Here, $cx = \cos(x/16 \cdot \pi)$ and $sx = \sin(x/16 \cdot \pi)$. Further, $pi$ ($i = 0$ to $7$) are values obtained as a result of the uni-dimensional inverse orthogonal transform process, and $Zi$ ($i = 0$ to $7$) are coefficient values before the uni-dimensional inverse orthogonal transform. These are the same in the following formulas.

Further, when it is assumed that the highest order coefficient is 0, $z7 = 0$, so that the formula (2) can be simplified as In the formula (3). This process is referred to as IDCT 7.

$$\begin{vmatrix} p0 \\ p7 \\ p1 \end{vmatrix} = \begin{vmatrix} c4 & c1 & c2 & c3 & c4 & s3 & s2 \\ c4 & -c1 & c2 & -c3 & c4 & -s3 & s2 \\ c4 & c3 & s2 & -s1 & -c4 & -c1 & -c2 \end{vmatrix} \begin{vmatrix} z0 \\ z1 \\ z2 \end{vmatrix} \quad (3)$$

$$\begin{vmatrix} p6 \\ p2 \end{vmatrix} = \begin{vmatrix} c4 & -c3 & s2 & s1 & -c4 & c1 & -c2 \\ c4 & s3 & -s2 & c1 & -c4 & s1 & c2 \end{vmatrix} \begin{vmatrix} z3 \\ z4 \end{vmatrix}$$

$$\begin{vmatrix} p5 \\ p3 \\ p4 \end{vmatrix} = \begin{vmatrix} c4 & -s3 & -s2 & -c1 & -c4 & -s1 & c2 \\ c4 & s1 & -c2 & s3 & c4 & c3 & -s2 \\ c4 & -s1 & -c2 & -s3 & c4 & -c3 & -s2 \end{vmatrix} \begin{vmatrix} z5 \\ z6 \end{vmatrix}$$

Further, when it is assumed that the highest and next order coefficients are 0, $z7 = 0$ and $z6 = 0$, so that the formula (2) can be simplified as in the formula (4). This process is referred to as IDCT 6.

$$\begin{vmatrix} p0 \\ p7 \\ p1 \end{vmatrix} = \begin{vmatrix} c4 & c1 & c2 & c3 & c4 & s3 \\ c4 & -c1 & c2 & -c3 & c4 & -s3 \\ c4 & c3 & s2 & -s1 & -c4 & -c1 \end{vmatrix} \begin{vmatrix} z0 \\ z1 \\ z2 \end{vmatrix} \quad (4)$$

-continued $$\begin{vmatrix} p6 \\ p2 \end{vmatrix} = \begin{vmatrix} c4 & -c3 & s2 & s1 & -c4 & c1 \\ c4 & s3 & -s2 & c1 & -c4 & s1 \end{vmatrix} \begin{vmatrix} z3 \\ z4 \end{vmatrix}$$

$$\begin{vmatrix} p5 \\ p3 \\ p4 \end{vmatrix} = \begin{vmatrix} c4 & -s3 & -s2 & -c1 & -c4 & -s1 \\ c4 & s1 & -c2 & s3 & c4 & c3 \\ c4 & -s1 & -c2 & -s3 & c4 & -c3 \end{vmatrix} \begin{vmatrix} z5 \end{vmatrix}$$

Likewise, simplified uni-dimensional inverse discrete cosine transforms IDCT 5 to IDCT 1 are prepared.

Now, the process operation according to the invention will be described in detail. The entropy decoding and inverse quantization process units 21 and 23 shown in FIG. 7 perform the same processes as described before in connection with the prior art. However, the position of the end-of-block code [EOB] obtained in the entropy decoding process is detected in the zig-zag scan process unit 22 as a value of an element in the zig-zag scan matrix as shown in FIG. 3. Here, this value is referred to as "VALID". It is a feature of the coding system that row of "0"s occur as high order coefficients according to the position of the end-of-block code (i.e., the value of VALID). This "VALID" valve is supplied from the zig-zag scan process unit 22 to the process selective type two-dimensional inverse orthogonal transform process 24.

When the quantized coefficient matrix is inversely quantized in the inverse quantization process unit 23, the process selective type two-dimensional inverse orthogonal process unit 24 effects inverse orthogonal transform of the inversely quantized coefficient matrix.

The operation of the process selective type two-dimensional inverse orthogonal transform process unit 24 will now be described with reference to FIG. 8. The two-dimensional inverse orthogonal transform can be realized by combining the horizontal uni-dimensional inverse orthogonal transform and the vertical uni-dimensional inverse orthogonal transform. In the instant example, the horizontal uni-dimensional inverse orthogonal transform is done prior to the vertical uni-dimensional inverse orthogonal transform.

When the horizontal uni-dimensional inverse discrete cosine transform selector 32 in the process selective type two-dimensional inverse transform process unit 24 receives the "VALID" valve indicative of the position of an end-of-block code [EOB] from the zig-zag scan process unit 22, it determines the row to be processed and selects one or some of the simplified uni-dimensional inverse discrete cosine transforms 33.

(1) With VALID = 1, all the elements in the 8×8 sample block are made to be the DC component value multiplied by a certain constant value, and the inverse orthogonal transform of this block is ended. The constant value used here is defined by the definition of the inverse orthogonal transform used.

(2) With VALID = 2, the horizontal uni-dimensional inverse orthogonal transform is done on only the first row of the 8×8 sample block. No processing is done on the other rows because the elements thereof are all 0. In this case, only IDCT 2 is selected.

(3) With VALID = 3, the horizontal uni-dimensional inverse orthogonal transform is done on only the first and second rows of the 8×8 sample block. No processing is done for the other rows because the elements thereof are all 0. In this case, only IDCT 2 and IDCT 1 are selected.

(4) With $4 \leq \text{VALID} \leq 9$, the horizontal uni-dimensional inverse orthogonal transform is done on only the first to third rows of the 8×8 sample block. No processing is done on the other rows because the elements thereof are all 0. In this case, the IDCT selection is done in conformity to the rules shown in FIG. 12, which will be described later in detail.

(5) With VALID=10, the horizontal uni-dimensional inverse orthogonal transform is done on only the first to fourth rows of the 8×8 sample block. No processing is done on the other rows because the elements thereof are all 0. IN this case, IDCT 1 to IDCT 4 are selected.

(6) With 11≦VALID≦20, the horizontal uni-dimensional inverse orthogonal transform is done on only the first to fifth rows of the 8×8 sample block. No processing is done on the other rows because the elements thereof are all 0. In this case, the IDCT selection is made in conformity to the rules of FIG. 12.

(7) With VALID=21, the horizontal uni-dimensional inverse orthogonal transform is done on only the first to sixth rows of the 8×8 sample block. No processing is done for the other rows because the elements thereof are all 0. In this case, IDCT 6 to IDCT 1 are selected.

(8) With 22≦VALID≦35, the horizontal uni-dimensional inverse orthogonal transform is done on only the first to seventh rows of the 8×8 sample block. No processing is done on the eighth row because the elements thereof are all 0. IN this case, the IDCT selection is done in conformity to the rules of FIG. 12.

(9) With 36≦VALID, uni-dimensional inverse orthogonal transform is done on all the rows. In this case, the IDCT selection is done in conformity to the rules of FIG. 12.

When the horizontal uni-dimensional inverse orthogonal transform of the row vector b of the coefficient matrix supplied from the buffer 31, performed with the IDCTs selected in the above way, is ended, the coefficient matrix after the end of the transform is stored tentatively in the buffer 34. Then, the vertical uni-dimensional inverse orthogonal transform is done on all the rows using the vertical uni-dimensional inverse discrete cosine transform selector 35 and the simplified uni-dimensional inverse discrete cosine transform group 36.

When the vertical uni-dimensional inverse discrete cosine transform selector 35 receives VALID from the zigzag scan process unit 22, it selects uni-dimensional inverse discrete cosine transform IDCT from the simplified uni-dimensional inverse discrete transform group 36 according to the value of the VALID as follows:

(1) With VALID=1, the coefficient matrix after the horizontal process is directly made the reproduced image.

(2) With VALID=2, uni-dimensional inverse orthogonal transform is done on the first to the eighth, i.e., all, rows using IDCT 1.

(3) With VALID=3, uni-dimensional inverse orthogonal transform is done on all the rows using IDCT 2.

(4) With 4≦VALID≦9, uni-dimensional inverse orthogonal transform is done on all the rows using IDCT 3.

(5) With VALID=10, uni-dimensional inverse orthogonal transform is done on all the rows using IDCT 4.

(6) With 11≦VALID≦20, uni-dimensional inverse orthogonal transform is done on all the rows using IDCT 5.

(7) With VALID=21, uni-dimensional inverse orthogonal transform is done on all the rows using IDCT 6.

(8) With 22≦VALID≦35, uni-dimensional inverse orthogonal transform is done on all the rows using IDCT 7.

(9) With 36≦VALID, uni-dimensional inverse orthogonal transform is done on all the rows using IDCT 8.

Through the above vertical uni-dimensional inverse orthogonal transform process, the 8×8 sample block of image is decoded.

The horizontal and vertical uni-dimensional inverse orthogonal transform processes on the 8×8 sample block as above, are performed over the entire image to obtain the reproduced image.

The operation of the horizontal uni-dimensional inverse discrete cosine transform selector 32 and vertical uni-dimensional inverse discrete cosine transform selector 35 will be described later in detail with reference to FIGS. 11 to 13.

FIG. 9 shows an example of horizontal uni-dimensional inverse discrete cosine transform with VALID=21. In this example, the uni-dimensional inverse discrete cosine transform on the top row is done using IDCT 6, and on the second row it is done using IDCT 5. Likewise, it is done on the third row using IDCT 4, on the fourth row using IDCT 3, on the fifth row using IDCT 2, and on the sixth row using IDCT 1. No process is done on the seventh and eighth rows because the elements thereof are all 0. Consequently, the transform process on the seventh and eighth rows can be omitted, thus simplifying the horizontal uni-dimensional inverse discrete cosine transform and permitting reduction of the operation quantity.

When the horizontal uni-dimensional inverse discrete cosine is ended in the above way, the vertical uni-dimensional inverse discrete cosine transform process is executed. This example of execution will be described with reference to FIG. 10.

With VALID=21, in all the column vectors as the subject of vertical uni-dimensional inverse discrete cosine transform, as shown in FIG. 10, two coefficients from the higher order are 0. Thus, the uni-dimensional inverse discrete cosine transform on the first to the eighth columns is done by using IDCT 6. As a result, there is no need of using IDCT 8 for the vertical uni-dimensional inverse discrete cosine transform process, thus permitting the reduction of the operation quantity in the transform process.

With other values of VALID, a suitable uni-dimensional inverse discrete cosine transform IDCT is likewise selected from the simplified uni-dimensional inverse discrete cosine transform groups 33 and 36 for decoding the 8×8 sample block.

In the above way, in this embodiment the horizontal and vertical uni-dimensional inverse discrete cosine transform processes can be suitably omitted according to the value of VALID, thus permitting reduction of the operation quantity. It is thus possible to obtain faster processing.

Now, the operation of the horizontal uni-dimensional inverse discrete cosine transform selector 32 and simplified uni-dimensional inverse discrete cosine transform group 33 shown in FIG. 8 will be described in detail with reference to FIGS. 11 and 12.

Referring to FIG. 11, in a step S1 a value of VALID indicative of the position of an end-of-block code [EOB] is obtained in the zig-zag scan process unit 22. In a subsequent step S2, all the elements in the buffer 34 (see FIG. 8), for storing coefficients after IDCT process, are cleared to 0. In a subsequent step S3, a check is done as to whether the value of VALID is 1. If the value is 1, a step S4 is executed. Otherwise, a step S5 is executed. In the step S4, all the element values are set to the leftmost upper end value of the coefficient matrix multiplied by a constant value. When the process in the step S4 is ended, the routine goes to a step S20 to end horizontal transform processing and then goes to vertical processing.

In the step S5, "ROW" indicative of the serial row number of the coefficient matrix is set to 1. In a subsequent step S6, a check is done as to whether the value of VALID is 2. If the value is 2, a step S7 is executed. Otherwise, a step S8 is executed. In the step S7, an adequate IDCT among the uni-dimensional inverse discrete cosine transform group 33 is selected and executed. The way of selection will be described later with reference to FIG. 12. When this process is ended, the routine goes to the step S20 to end the horizontal transform process.

In the step S8, a check is done as to whether the value of VALID is 3. If the value is 3, a step S9 is executed. Otherwise, a step S12 is executed. In the step S9, an adequate IDCT among the uni-dimensional inverse discrete cosine group 33 is selected and executed. The way of selection will be described later with reference to FIG. 12. When the process in the step S9 is ended, a check as to whether ROW=2 is done in a step S10. If this step yields "NO", the "ROW" is incremented in a step S11, and then the step S9 is executed again. If the check in the step S10 yields "YES", the step S20 is executed to end the horizontal transform process.

Likewise, the operations of the following steps are executed. These operations are same as described before, and therefore their description is omitted.

Now, the way of IDCT selection in the steps S7, S9, S13, . . . will be described with reference to FIG. 12. First, the value of "ROW" is determined. Then, the row corresponding to "ROW" of a predetermined value is traced to the right to find a column including the value of "VALID". If a column including the value of "VALID" is specified, the IDCT process written at the top of that column is selected. For example, in the case of the step S7, in which ROW=1 and VALID=2, IDCT 2 is selected. In the case of the step S9, in which ROW=1, 2, and VALID =3, IDCT 2 and IDCT 1 are selected for each row. Further, with VALID of 8, for instance, in the step S12, in which ROW=1, 2, 3, IDCT 4, IDCT 3 and IDCT 1 are selected for each row. Likewise, the IDCT selection is done according to the values of "ROW" and "VALID".

Now, the operation of the vertical uni-dimensional inverse discrete cosine transform selector 35 and simplified uni-dImensional inverse discrete cosine transform group 36 In FIG. 8 will be described with reference to FIG. 13.

In a step S31, a value of VALID representing the position of end-of-block code [EOB] is obtained from the zig-zag scan process 22. In a subsequent step S32 a check is done as to whether the value of VALID is 1. If the value is 1, a step S33 is executed. Otherwise, a step S34 is executed. In the step S33, the coefficient matrix after the horizontal process is directly made the reproduced image. When the process of the step S33 is ended, a step S50 is executed to end the process selective type two-dimensional inverse orthogonal transform process.

In the step S34, "COL" representing the serial number of column in the coefficient matrix is set to 1. In a subsequent step S35 a check is done as to whether the VALID value is equal to 2. If the check yields "YES", a step S36 is executed. Otherwise, a step S39 is executed. In a step S36, IDCT 1 is selected, and the process on the first column of the coefficient matrix is executed. In a subsequent step S37, a check is done as to whether COL=8. If this check yields "NO". "COL" is incremented. Then, the routine goes back to the step S36 to execute the selection of IDCT 1 and the process on the second column of the coefficient matrix. Next, the processes on the third to the eighth column of the coefficient matrix are executed by turns. When the step S37 yields "YES", the routine goes to the step S50 to end the two-dimensional inverse orthogonal process.

If the check in the step S39 yields "YES", a step S40 is executed. Otherwise, a step S43 is executed. When the check in the step S41 yields "YES" in the execution of the steps S40 to S42, the first to eighth columns of the coefficient matrix are executed using IDCT 2 process. If the check in the step S41 yields "YES", the step S50 is executed.

The process in the step S43 and following steps is the same as described before, and it is not described.

In the above embodiment the horizontal uni-dimensional inverse discrete cosine transform process is executed before the vertical uni-dimensional inverse discrete cosine transform process. However, this is by no means limitative, and the invention is applicable as well to the inverse order process. Further, the invention is applicable to a case that adopts the FFT or like well-known fast operation means for reducing the operation quantity instead of direct calculation on the basis of the formula (2).

Further, the invention is applicable not only to a method in which the two-dimensional inverse orthogonal transform is realized with combination of the horizontal, uni-dimensional inverse orthogonal transform and the vertical uni-dimensional inverse orthogonal transform, but also a method in which the two-dimensional inverse orthogonal transform of $8 \times 8$ elements is done by dividing the elements into $4 \times 4$ or $2 \times 2$ elements.

As has been described in the foregoing, according to the invention the value of VALID indicative of the position of an end-of-block code appearing in entropy coded data is used to detect a portion of "0" elements in the frequency range coefficient matrix so that the inverse orthogonal transform process is locally or fully omitted. Thus, the invention permits faster execution of the decoding of compressed digital image data of source image and faster realization of image reproduction.

What is claimed is:

1. A method of decoding compressed digital image data using orthogonal transform, in which:

if one or some of the coefficients in an orthogonal transform coefficient matrix are zero, the inverse orthogonal transform process in the decoding process is either locally omitted or simplified by omitting multiplication and addition operations on the basis of the distribution of the zero coefficients, and if all the coefficients of a row or a column of the orthogonal transform coefficient matrix are zero, the uni-dimensional inverse orthogonal transform of said row or column is omitted.

2. A method of decoding compressed digital image data using orthogonal transform in which:

the orthogonal transform process uses a uni-dimensional inverse orthogonal transform for each row or each column of an orthogonal transform coefficient matrix, and if one or some of the coefficients of a row or column in the orthogonal transform coefficient matrix are zero, the uni-dimensional inverse orthogonal transform executed on said row or column omits multiplication and addition operations pertaining to said zero coefficients in said row or column.

3. A system for decoding compressed digital image data using orthogonal transform comprising:

means for detecting, from a coefficient row obtained as a result of rearrangement of the elements of a quantized coefficient matrix in the order of values of elements of a zig-zag scan matrix, a particular value indicative of the position of the last non-"0" coefficient;

means for selecting a horizontal simplified uni-dimensional inverse orthogonal IDCT according to said particular value; and means for effecting uni-dimensional inverse orthogonal transform on row elements of said orthogonal transform coefficient matrix by using said selected uni-dimensional inverse orthogonal transform IDCT.

4. A system for decoding compressed digital image data using orthogonal transform comprising:

means for detecting, from a coefficient row obtained as a result of rearrangement of the elements of a quantized coefficient matrix in the order of the values of the elements of a zig-zag scan matrix, a particular value indicative of the position of the last non-"0" coefficient;

means for selecting a vertical simplified uni-dimensional inverse orthogonal transform IDCT according to said particular value; and means for effecting uni-dimensional inverse orthogonal transform on the column elements of said orthogonal transform coefficient matrix by using said selected uni-dimensional inverse orthogonal transform IDCT.

5. A system for decoding compressed digital image data using orthogonal transform comprising:

means for detecting, from a coefficient row obtained as a result of rearrangement of the elements of a quantized coefficient matrix, in the order of the element values of a zig-zag scan matrix, a VALID value indicative of the position of the last non-"0" coefficient;

means for selecting a horizontal simplified first uni-dimensional inverse orthogonal IDCT;

means for effecting uni-dimensional inverse orthogonal transform on the row elements of said orthogonal transform coefficient matrix by using said first uni-dimensional inverse orthogonal transform IDCT;

means for selecting a vertical simplified second uni-dimensional inverse orthogonal transform IDCT according to said particular value; and means for effecting uni-dimensional inverse orthogonal transform on the column elements of said orthogonal transform coefficient matrix by using said second uni-dimensional inverse orthogonal transform IDCT.

* * * * *